United States Patent

[11] 3,583,804

[72] Inventor Peter F. Mueller
 Concord, Mass.
[21] Appl. No. 783,156
[22] Filed Sept. 30, 1968
[45] Patented June 8, 1971
[73] Assignee Technical Operations, Incorporated
 Burlington, Mass.
 Continuation-in-part of application Ser. No. 510,807, Dec. 1, 1965, now Patent No. 3,425,770, dated Feb. 4, 1969.

[54] PHOTOSTORAGE AND RETRIEVAL OF MULTIPLE IMAGES BY DIFFRACTION PROCESSES WITH CROSS-TALK SUPPRESSION
 8 Claims, 9 Drawing Figs.
[52] U.S. Cl. ........................................... 355/2,
 178/5.4, 350/162, 350/164, 352/45, 355/40, 355/71
[51] Int. Cl. ..................................................... G03b 27/76

[50] Field of Search.......................................... 355/2, 40, 71; 352/45; 350/162, 164; 178/5.4

[56] References Cited
UNITED STATES PATENTS

| | | | |
|---|---|---|---|
| 2,050,417 | 8/1936 | Bocca............................ | 352/45 |
| 3,314,052 | 4/1967 | Lohmann...................... | 350/162X |
| 3,320,852 | 5/1967 | Parrent, Jr. et al. .......... | 350/162X |

Primary Examiner—Samuel S. Matthews
Assistant Examiner—Richard A. Wintercorn
Attorney—Alfred H. Rosen ABSTRACT: This application depicts methods and structures for suppressing crosstalk in the photostorage and selective retrieval of one or more of a plurality of images recorded in additive superposition and in respective multiplication with a unique spatial carrier function. A first method disclosed involves the formation of a density record which is processed to substantially $\gamma=-2$. A second method involves the use of low duty-cycle carrier functions.

PETER F. MUELLER
INVENTOR.

BY ALFRED H. ROSEN
and
JOHN H. COULT
ATTORNEYS

PHOTOSTORAGE AND RETRIEVAL OF MULTIPLE IMAGES BY DIFFRACTION PROCESSES WITH CROSS-TALK SUPPRESSION

This application is a continuation-in-part of application Ser. No. 510,807, filed Dec. 1, 1965 by Peter F. Mueller, now U.S. Pat. No. 3,425,770 issued Feb. 4, 1969.

BACKGROUND OF THE INVENTION

There has been considerable knowledge of many years of diffraction gratings made up of alternating opaque and transparent lines used to produce diffraction patterns in which the interference of light will produce a sequence of light and dark areas related to the period of the grating. The light areas are called diffraction orders of the grating.

It is well recognized that most types of photostorage material such as microfilm, for example, are capable of storing a good deal more information density over a given surface area than is usually the case. Since information is recorded on film in vast quantities today the cost of film and processing has become substantial and storage space even for microfilm is not insignificant.

With the birth of the laser an awakening of interest in the field of coherent light has produced great advances in the knowledge of light diffraction, how it operates, and what advantages can be obtained from it.

If a diffraction grating is positioned in the front focal plane of a lens and is illuminated by collimated light from a point source, the diffraction pattern in the back focal plane of the lens (called the Fourier transform plane) will appear as a series of dots (a Dirac delta function array) extending in a line perpendicular to the lines of the grating about the optical axis. If the grating is rotated in a plane traverse to the optical axis, the line of dots is rotated with the grating so as to maintain this perpendicular relationship. Thus it can be seen that light passing through a diffraction grating will occupy positions in the transform plane that will be different for different angular positions of the grating.

If an object, such as a photographic transparency, is placed in the position of the grating described above a diffraction pattern of the object will appear in the transform plane. Now, if the grating and the object are superimposed in multiplicative relationship in the front focal plane of the lens, a diffraction pattern of the grating convolved with the object spectrum appears in the transform plane. Thus, at each diffraction order of the grating, an object spectrum is found. A second lens can be placed a focal length beyond the transform plane described above and it will retransform the diffraction patten back to an image of the superimposed object and the grating. If this image is displayed on a screen in the back focal plane of the second lens, and an opaque mask is positioned in the transform plane which has transparent apertures passing the diffracted and undiffracted (zeroth) orders the displayed image will be substantially unaffected. If this mask passes only one of the diffracted orders (i.e., one object spectrum) it will show an image of the object but without the grating.

The mask placed in the transform plane is technically described as a "spatial filter". A spatial filter may be defined as an object placed in the Fourier transform plane of an optical system for modifying amplitude and/or phase of selected spatial frequencies. In the present invention this "modifying" is a blocking by absorption or reflection of all but selected diffraction orders along selected radii in the transform plane.

Assuming that the grating described above had vertical lines and that a second image multiplied with a second grating was positioned in the front focal plane of the first lens with the grating lines rotated 45° from vertical, the second image spectrum could not get through the mask in the transform plane which had been arranged to pass only diffracted orders of a vertical grating. If the mask is rotated 45° in the proper direction an image of the second object will be retrieved.

To some extent these things have been recognized in the art. An article by Armitage and Lohmann entitled "Theta Modulation in Optics" has been published in Applied Optics, Apr. 1965, pages 399 to 403. Armitage and Lohmann in their article describe various complex ways of breaking up an image into separate portions related to the angle of a diffraction grating pattern over each of the separate portions.

In accordance with the present invention it has been found that a plurality of images can be stored in a photostorage medium each being periodically modulated in a manner which makes it possible to separate them out one from the other by simple and practical optical means. In general this can be done by exposing to a plurality of objects sequentially, each through an amplitude diffraction grating, in the area of a photostorage medium. The grating through which the exposure for each object is made is given a different angular orientation for each exposure. The composite record thus formed represents a plurality of additively recorded images respectively multiplied with a periodic carrier function of unique azimuthal orientation. Separation of the images is accomplished with the aid of a spatial filter in a transform plane of a coherent optical system where the diffracted spectra of all of the images are convolved each with a diffraction pattern of its respective grating.

If, for some reason, the separate carrier-modulating images are recorded multiplicatively as well as additively, that is, the processed record has a cross-product term or terms, then by the convolution phenomenon not only will each image spectra and its associated delta function array be convolved (the primary effect), but each delta function array and image spectra will be convolved with all others. The unwanted convolutions represent cross-talk.

OBJECTS OF THE INVENTION

It is an object of the invention of define a diffraction method for photostoring and retrieving one or more of a plurality of images so as to eliminate crosstalk completely or at least minimize the effects thereof during readout of the stored images.

BRIEF DESCRIPTION OF THE DRAWINGS

Further objects and features of the present invention will become apparent upon reading the following specification together with the drawings in which.

DESCRIPTION OF THE PREFERRED EMBODIMENTS

In each embodiment of the present invention, photographic exposures are made using conventional techniques. Illumination from any source normally used for photography is suitable, however, as will be seen, some distinctions will be made in the type of photographic material used, or in the use of particular screens and gratings or in the exposure values used.

Figures 1, 2, 3A, 3B, 3C, 4, 5:
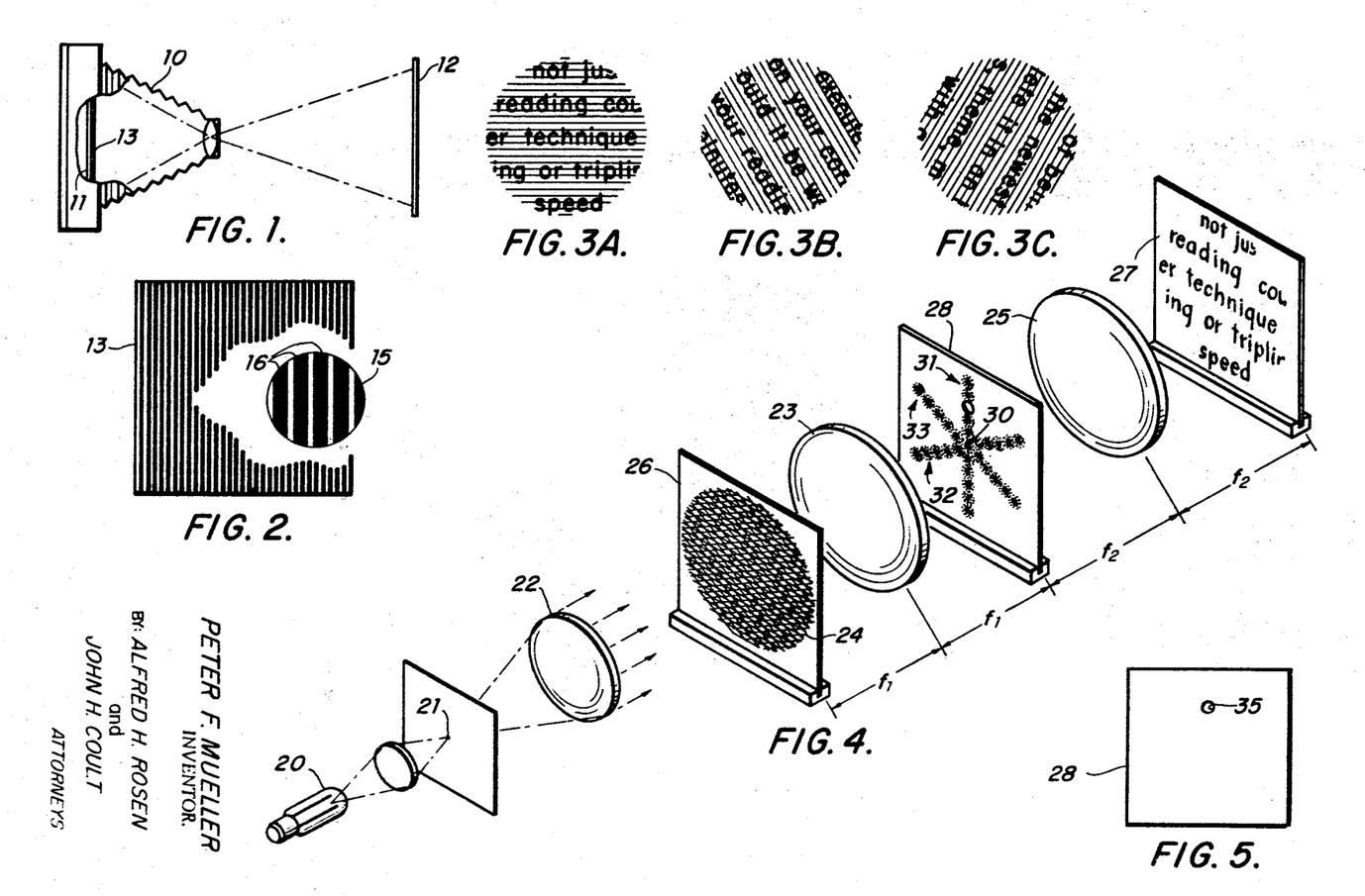
FIG. 1 is a diagrammatic illustration of a camera system for making exposures in connection with the invention.
FIG. 2 illustrates a diffraction grating for use in the present invention.
FIG. 3A, 3B and 3C illustrate a sequence of three exposures made in accordance with an embodiment of the invention.
FIG. 4 is a projection of a coherent optical system for readout of images stored in accordance with the invention.
FIG. 5 illustrates a spatial filter for use in the transform plane of the optical system of FIG. 4.

FIG. 1 depicts a camera 10 containing a photographic plate 11. An object 12 to be photographed could be, for example, a printed page. It can also be any continuous tone subject of photography. As described and claimed in the above-referenced copending application, of which this is a continuation-inepart, photographic plate 11 may expose to diffraction grating 13 multiplied with the object. When the object is a printed page or similar two-dimensional article, grating 13 may be positioned immediately adjacent to object 12. Grating 13 can also be positioned immediately adjacent to photographic plate 11 as depicted in FIG. 1, or object 12 and grating 13 can be optically multiplied so that they are imaged at photographic plate 11 as a product. For purposes of the invention it is critical that the grating and the object be imaged on the photostorage member as a product and not as a sum. Since it is desirable to limit the image resolution to a frequency less than that of the grating, it is sometimes preferable to position the grating adjacent to the film. This permits using the camera itself to limit the resolution of the image. Image resolution can be limited by stopping the camera lens down, by defocusing or by introducing a grained filter.

Diffraction grating 13 is illustrated in greater detail in FIG. 2. Diffraction grating 13 is an amplitude grating of periodic opaque and transparent bars. An amplitude grating is defined as one that alters the amplitude with no substantial alteration in the phase of an incident wave. A small section 15 of grating 13 is illustrated greatly enlarged for descriptive purposes. Referring to enlarged portion 15, black bars 16 are opaque while the narrow bars between them are transparent. A period of the grating is the width of one transparent bar plus the width of one opaque bar.

Perhaps the most common diffraction gratings are called "Ronchi ruling" in which the width of the opaque bars and the transparent bars is identical. While Ronchi rulings are operative in the present invention, it has been found preferable to use opaque bars that are wider then the transparent bars as illustrated in enlarged portion 15, as explained in detail below.

The simplest type of object to store photographically is a binary object. Binary is used here to mean an object having only two density levels, for example, a printed page of black on white. Color makes no difference but there should be only two density levels as seen by the photographic material. In practice this condition can be enhanced by using a suitable photographic film and processing to a high gamma. Gamma is used conventionally to mean the slope of the straight line portion of the density versus log exposure curve.

FIG. 3A, 3B and 3C illustrate three exposures of a printed page with a grating superimposed. Although not mandatory, it is preferable that the 60°spatial frequency be in the order of twice the image spatial bandwidth so as to prevent overlap of spectra in the transform plane. A first printed object may be exposed with the grating lines horizontal as depicted in FIG. 3A. Exposure may then be made on the same emulsion to a second printed object with the grating rotated 60° as illustrated in FIG. 3B, and an exposure made of a third printed object with a grating rotated an additional 60° as illustrated in FIG. 3C. The film may be Kodalith Ortho plates having a normal gamma greater than 4. "Kodalith" is a trademark of Eastman Kodak Company, Rochester, New York. The photographic plate was processed normally, obtaining three recorded superimposed images as roughly illustrated in transparency 24 in FIG. 4 supported in frame 26.

Transparency 24 represents the composite developed photographic transparency made from exposing a photosensitive member to the three exposures illustrated in FIG. 3A, 3B, and 3C. In the interest of simplicity, only the grating modulation lines at the three different angles have actually been drawn in the depicted transparency. It should be noted that the Kodalith Ortho plate as well as other photostorage media used for the present invention generally have only one photosensitive storage layer. Thus the superimposed images are mixed in the same layer.

As can be seen in FIG. 4 photograph 24 containing several superimposed images is not readily legible but is of an advantage for increasing storage density. When it is desired to use these images they must be separated out from one another and recorded separately as on a new photosensitive member or merely displayed in some form of viewer.

FIG. 4 illustrates diagrammatically an optical system for viewing or recording images that are superimposed as described above. FIG. 4 illustrates a fairly conventional coherent optical system comprising light source 20, pin hole aperture 21, collimating lens 22, converging lenses 23 and 25 separated by the sum of their focal lengths $f_1$ and $f_2$, frame means 26 for supporting an object, and support means 27 for supporting a photosensitive medium or display screen. A spatial filter 28 is also depicted in the back focal plane of lens 23 and the front focal plane of lens 25. For simplicity of illustration, spatial filter 28 is depicted as in a fixed support. Nevertheless it is to be understood that the spatial filter will generally be mounted so that it may be rotated in a plane transverse to the optical axis. Fixed filters such as the one depicted must be replaced with filters having apertures at other fixed locations for passing diffraction spectra of other images.

For purposes of the invention light source 20 should be an intense light source and an arc lamp or laser will be suitable. A mercury arc lamp was used in carrying out the examples described herein.

The pin hole aperture 21 is used to increase the coherency of the light and collimating lens 22 following the aperture provides a collimated beam of a selected diameter. With a collimated beam the distance between the collimator and the rest of the system becomes noncritical. With an uncollimated beam magnification can be obtained.

The position of filter 28 in the back focal plane of lens 23 is called the Fourier transform plane. It can be seen that the collimated beam from collimating lens 22 will be brought to a point focus at the transform plane. If the beam is not collimated, the optical system must be arranged so that the beam is still brought to a focus at the transform plane. Further optics can also be used at the image end of the system for magnifying or reducing the size of the image.

Light from source 20 must be at least partially coherent at the illumination plane where an object supported in frame 26 is illuminated. The required degree of spatial coherence is related to the object resolution, preferably the illuminating wave fronts are coherent over at least a few grating periods.

With photograph 24 (a transparency) positioned in frame 26 a diffraction pattern will appear in the transform plane. This diffraction pattern is depicted at filter 28 in FIG. 4. Collimated light that is undisturbed by the object will be focused to the center of the transform plane as a spot illustrated as the central illumination spot 30 at filter 28. This spot represents the zeroth order of each grating and is commonly called the DC spot. Since this spot is independent of grating orientation its location will be common to all the images 24 superimposed in the object. One of the purposes of the spatial filter 28 is to block the DC spot which carries information associated with all of the images. A vertical series of spots 31 represent diffraction orders of the horizontal grating related to the exposure of FIG. 3A. Extending out in both directions beyond the zeroth diffraction order are the first, second, third, fourth and fifth diffraction orders.

The diffraction orders 32 related to the exposure of FIG. 3B are in a line rotated 60° clockwise from the diffraction orders 31 and the diffraction orders 33 related to the exposure of FIG. 3C are in a line rotated 60° clockwise from the diffraction orders 32.

FIG. 4 shows only diffraction orders along the primary axes of diffraction. In practice, due mainly to nonlinearities in photographic processing, cross-products appear along axes parallel with the primary axes. In separating out any specific image undesirable interference from these cross-products is preferably minimized by selecting a primary diffraction order that has little interference from cross-products.

In the binary example described above readout was obtained by placing spatial filter 28 illustrated in FIG. 5 in the transform plane of FIG. 4. Filter 28 is opaque except at aperture 35. Aperture 35 is located to pass third order diffractions of the 12 lines per millimeter grating. By rotating filter 28 in a transform plane along the optic axis of the system, the aperture can selectively pass one third order diffraction of each of the three exposures depicted in FIG. 3. The size of aperture 35 is determined to pass the complete third order diffraction with the image spectrum An image of each of the FIG. 3 exposures was recorded at support 27 by positioning filter aperture 35 to pass a third order diffraction of the grating convolved with the object spectrum of the respective exposure. The recorded images obtained with a resolution of 6 lines per millimeter were highly legible. There were disruptions in characters where the characters of one exposure actually intercepted portions of characters in another exposure. These disruptions are believed to result from diffraction of the light into cross-product orders caused by intersection of rulings in the object. As will be discussed in detail hereinafter, it is an object of this invention to suppress such crosstalk effects.

Referring to FIG. 3 it will be noted that the printed lines in each exposure are rotated with respect to lines in the other exposures. This is done to minimize the number of points at which characters in two or more different exposures actually intercept one another. Although FIG. 3 depicts the printed lines as parallel with the grating lines in each exposure, this is only for simplicity of illustration. The printed lines can readily run at a different angle with respect to the respective grating in each exposure.

The amount of effective degradation for a given image resolution can always be reduced by increasing the grating frequency. It must be remembered, however, that the photostorage material used must always resolve the grating.

While more image light can be obtained at support 27 by passing more of the grating diffraction orders, this places additional burdens on the optical system for obtaining exact image registration at the support plane. Passing other diffraction orders will also introduce fringes derived from the gating at the support plane, but with high frequency fringes or a low resolution recording material at support 27, the fringes can be made invisible.

The maximum number of superimposed binary images of a given resolution that can be stored by the present method is limited by the resolution capabilities of the storage medium. Thus, if the storage medium has a resolution capability of 180 lines per millimeter, the grating cannot exceed 180 lines per millimeter and the stored images must be limited to one-half the grating frequency or not more than 90 lines per millimeter. This all assumes that the diffraction orders will be virtually touching each other and at best $3n$ separate images can be obtained at the $n$th diffraction order. Whether or not we can go out to a given order depends on the coherent optical system. Lens 23 in FIG. 5 must have a diameter equal to the maximum diameter of the object in frame 26 plus the center to center distance between the DC spot and the selected order of diffraction in the transform plane.

Given the circumstances stated above and a coherent optical system adequate for operating with the fifth order, we can increase the number of storage spaces available by decreasing the resolution of the stored images below 90 lines per millimeter. With decreased resolution the diffraction spots will be smaller leaving additional space between them. Thus, if the diameter of the image spectrum can be halved, the storage space will be doubled.

The system as described above operates well with binary images, but when the number of density levels is increased above two, severe image degradation results, due principally to crosstalk effects. Thus, if it is required to store continuous tones, for example, further measures must be taken, as prescribed by the teachings of this invention.

Since gratings and spatial carriers are the basis of the multiple image process, we will first review some of the basic characteristics of periodic functions in coherent optical systems using the formalism developed by Parrent and Thompson in Soc. Photo. Inst. Eng. Jounral, Vol. 3, p. 57 (1965). The two most commonly used optical transforming systems are here referred to as "exact" and "approximate" Fourier Transform systems. In the first system an exact Fourier transform $\tilde{\psi}(x,y)$ is produced in the back focal plane when the complex amplitude distribution $\psi(\xi,\eta)$ exists in the front focal plane, that is $$\tilde{\psi}(x, y) = \int_{-\infty}^{\infty} \int_{-\infty}^{\infty} \psi(\xi, \eta) e^{\frac{ik}{f}(\xi x + \eta y)} d\xi d\eta. \quad (1)$$

The transform is exact under the usual conditions of quasi-monochromaticity, paraxial optics, etc. In the second system the Fourier transform is also formed in the back focal plane, but the object distribution is taken over the lens aperture. However, in this case, a quadratic phase $$e^{(ik|\underline{x}|^2/2f)}$$

multiplies the Fourier transform and the system is described as "approximate," not because the transform is any less valid but because of the multiplicative phase term. This approximate system is more useful in the multiple image process and it produces the transform $$\tilde{\psi}'(x, y) = e^{\frac{ik|\underline{x}|^2}{2f}} \int_{-\infty}^{\infty} \int_{-\infty}^{\infty} \psi(\xi, \eta) e^{\frac{ik}{f}(\xi x + \eta y)} d\xi d\eta. \quad (2)$$

The quadratic phase factor is only significant if the term $\tilde{\psi}(x,y)$ interacts with another coherent term or with a background as in holography. But, such a background does not arise in the multiple image process under consideration, so we can assume $\tilde{\psi}'(x,y)$ is equivalent to $\tilde{\psi}(x,v)$ in spatial filtering operations. In the notation of Eq. (1), the Fourier transform pair is completely symmetrical, that is $$\psi(\xi, \eta) = \int \int \tilde{\psi}(x, y) e^{\frac{-ik}{f}(x\xi + y\eta)} dxdy, \quad (3)$$

where $k = 2\pi/\lambda$.

To illustrate this optical Fourier transformation, consider a simple one-dimensional cosine grating existing over a $(\xi,\eta)$ plane but varying only along the $\xi$ axis. The function is $$A(\xi) = a + b \cos 2\pi\omega_0\xi = a + b/2[e^{2\pi i\omega_0\xi} + e^{-2\pi i\omega_0\xi}] \quad (4)$$

where "$a$" equals one-half the maximum transmission of the grating and "$b$" is the amplitude of the fluctuating component.

Its Fourier transform by Eq. (1) is $$\tilde{A}(x) = a \int e^{2\pi i\left(\frac{x}{f\lambda}\right)\xi} d\xi + b/2 \int \left[ e^{2\pi i\left(\frac{x}{f\lambda} + \omega_0\right)\xi} + e^{2\pi i\left(\frac{x}{f\lambda} - \omega_0\right)\xi} \right] d\xi, \quad (5)$$

but using the common representation of a delta function we find that $$\delta(x - x_0) = \int e^{-2\pi i\xi(x - x_0)} d\xi. \quad (6)$$

Equation (5) can be written as $$\tilde{A}(x) = a\delta\left(\frac{x}{f\lambda}\right) + b/2\left[\delta\left(\frac{x}{f\lambda} + \omega_0\right) + \delta\left(\frac{x}{x\lambda} - \omega_0\right)\right]. \quad (7)$$

Thus, the transform appears as a set of delta functions, one at the origin of weight $a$, and one each at $x=\pm f\lambda\omega_0$ of weight $b/2$. We refer to the delta function at the origin as the DC component of the A ($\xi$) spectrum, since the $x$-$y$ plane is calibrated in terms of spatial frequency. The delta functions at $\pm f\lambda\omega_0$ are likewise the harmonic components.

We can now generalize and write the Fourier transform for an arbitrary periodic function $P(\xi,\eta)$:

$$P(\xi, \eta) = \sum_{n=-\infty}^{\infty} b_n e^{2\pi i \frac{n}{p}\xi}$$

$$b_n = \int_{-p/2}^{p/2} P(\xi, \eta) e^{-2\pi i \left(\frac{n}{p}\right)\xi} d\xi, \quad (8)$$

as $$\tilde{P}(x, y) = \sum_{n=-\infty}^{\infty} b_n \int_{-\infty}^{\infty} e^{2\pi i \left(\frac{x}{f\lambda}+\frac{n}{p}\right)\xi} d\xi = \sum_{n=-\infty}^{\infty} b_n \delta\left(\frac{x}{f\lambda}+\frac{n}{p}\right) \quad (9)$$

Thus, a symmetrical array of delta functions can be obtained from a simple periodic grating, with the weight of each delta function determined by the harmonic content of the grating.

Rectangular, or binary level, gratings represent a nonbandlimited form of Eq. (8). These gratings are important because they are the easiest to simulate with high-contrast photographic processing.

In practice, we can very closely approximate certain types of rectangular gratings (Ronchi ruling) by retaining only five or so harmonics. However, narrow slit gratings will keep their characteristic shape only if large =of harmonics are retained. Consider a generalized rectangular grating of period P having maximum transmittance T over the bar width $a$ and minimum transmittance T over the slit width $(1-a/p)$. The grating fundamental frequency $1/p$). A superposition approach will be used to find the Fourier transform of the grating by finding the transform of one period and then adding up the contributions of all periods. Assuming a zero coordinate at the center of a slit, we then obtain $$\tilde{P}(x, y) =$$

$$\sum_{n=-\infty}^{\infty} T \int_{np-\frac{(p-a)}{2}}^{np+\frac{(p-a)}{2}} e^{\frac{2\pi i}{f\lambda}\xi x} d\xi + t \int_{np+\frac{(p-a)}{2}}^{np+\frac{(p+a)}{2}} e^{\frac{2\pi i}{f\lambda}\xi x} d\xi$$

(10)

$$\tilde{P}(x, y) = \left[\frac{Tf\lambda}{2\pi i x}\left(e^{\frac{\pi i}{f\lambda}(p-a)x} - e^{-\frac{\pi i}{f\lambda}(p-a)x}\right)\right.$$

$$\left. + \frac{tf\lambda}{2\pi i x}\left(e^{\frac{\pi i}{f\lambda}(p+a)x} - e^{\frac{\pi i}{f\lambda}(p-a)x}\right)\right] \sum_{n=-\infty}^{\infty} e^{\frac{2\pi i n p x}{f\lambda}}$$

(11)

$$= \left[T(p-a) \operatorname{sinc} \frac{\pi(p-a)x}{f\lambda} + tae^{\frac{\pi i p x}{f\lambda}} \operatorname{sinc} \frac{\pi a x}{f\lambda}\right] \sum_{n=-\infty}^{\infty} e^{\frac{2\pi i n p x}{f\lambda}}$$

(12)

But we can write the sum of exponentials as a Dirac comb as follows:

$$\sum_{n=-\infty}^{\infty} e^{\frac{2\pi i n p x}{f\lambda}} = \frac{f\lambda}{p}\sum_{n=-\infty}^{\infty} \delta\left(x+\frac{nf\lambda}{p}\right) = \frac{1}{p}\sum_{n=-\infty}^{\infty} \delta\left(\frac{x}{f\lambda}+\frac{n}{p}\right)$$

(13)

so that the Fourier transform is a Dirac comb multiplied by the envelope function shown in the brackets of Eq. (14):

$$\tilde{P}(x, y) =$$

$$\left[T\left(1-\frac{a}{p}\right) \operatorname{sinc} \pi\left(\frac{p-a}{p}\right)x + t\left(\frac{a}{p}\right)e^{\frac{i\pi p x}{f\lambda}} \operatorname{sinc} \frac{\pi a x}{f\lambda}\right]$$

$$\sum_{n=-\infty}^{\infty} \delta\left(\frac{x}{f\lambda}+\frac{n}{p}\right). \quad (14)$$

We can further simplify Eq. (14) by writing it in the form of Eq. (9) and noting that $$b_n = (T-t)\left(1-\frac{a}{p}\right) \operatorname{sinc} n\pi\left(1-\frac{a}{p}\right) + t \operatorname{sinc} n\pi \quad (15)$$

Thus, the most general rectangular grating has the Fourier transform $$\tilde{P}(x, y) =$$

$$\sum_{n=-\infty}^{\infty} \left[(T-t)\left(1-\frac{a}{p}\right) \operatorname{sinc} n\pi\left(1-\frac{a}{p}\right) + t \operatorname{sinc} n\pi\right]$$

$$\delta\left(\frac{x}{f\lambda}+\frac{n}{p}\right) \quad (16)$$

Notice how the grating bar width $a$ determines the fraction of incident light that falls in the DC as well as the rate at which the harmonics decrease. The narrower $a$ is with respect to $p$, the slower $b_n$ will fall off and the greater $b_0$ will be as long as $T>t$. For example, with $a=p/10$, $T=1$ and $t=0$, we obtain $|b_0|=0.9$     $|b_3|=0.270/\pi$
$|b_1|=0.309/\pi$     $|b_4|=0.283/\pi$
$|b_2|=0.294/\pi$     $|b_5|=0.200/\pi$.

Thus, the first-order intensity $b_1{}^2$ is only slightly greater than twice the fifth-order intensity $b_5{}^2$. On the other hand, for a Ronchi ruling, $a=p/2$, $T=1$ and $t=0$ so that Eq. (16) reduces to $$\tilde{P}(x, y) = \sum_{n=-\infty}^{\infty} \frac{1}{2} \operatorname{sinc} \frac{n\pi}{2} \delta\left(\frac{x}{f\lambda}+\frac{n}{p}\right) \quad (17)$$

which gives $|b_0|=0.5$     $|b_3|=1/3a0b$     $|b_1|=1/\pi$     $|b_4|=0$
$|b_2|=0$     $|b_5|=1/5a0b$.

Now the first order is 25 times brighter than the fifth order. This discussion indicates that a Ronchi ruling will yield the brightest first-order harmonic within the general class of rectangular gratings. However, as will be pointed out hereinafter, the crosstalk generated by Ronchi rulings used as image carrier functions is substantially greater than the crosstalk generated by rulings having higher bar/slit ratios.

In this general discussion we have only considered gratings that were periodic along one of our Cartesian coordinates, $\xi$. Now we will consider the case of a rotated grating (i.e., one that has periodic components along both the $\xi$ and $\eta$ axes). Choosing $\xi$ in the grating direction is a solution only for a single grating, but this is no solution when a multiplicity of gratings is used.

Consider cosine fringes of arbitrary orientation with rotated coordinates $(\xi', \eta')$. Transformation from the rotated coordinates to the standard system is accomplished by the substitution $$\xi' = \xi \cos\theta - \eta \sin\theta$$
$$\eta' = \xi \sin\theta + \eta \cos\theta$$ Thus, the fringe pattern
$$P(\xi',\eta') = a + b \cos 2\pi(\xi'/p) \quad (19)$$

can be written as $$P(\xi, \eta) = a + b \cos(2\pi/p)[\xi \cos\theta - \eta \sin\theta], \quad (20)$$ or with separated coordinates as $$P(\xi, \eta) = a + b\left[\cos 2\pi\left(\frac{\cos\theta}{p}\right)\xi \cos 2\pi\left(\frac{\sin\theta}{p}\right)\eta +\right.$$

$$\left. \sin 2\pi\left(\frac{\cos\theta}{p}\right)\xi \sin 2\pi\left(\frac{\sin\theta}{p}\right)\eta\right] \quad (21)$$

The Fourier transform of Eq. (21.) must be explicitly a two-dimensional transform, that is, $$\tilde{P}(x, y) = \int_{-\infty}^{\infty}\int_{-\infty}^{\infty} P(\xi, \eta) e^{\frac{2\pi i}{f\lambda}(\xi x+\eta y)} d\xi d\eta \quad (22)$$

Thus, the Fourier transform of Eq. (21) is $$\tilde{P}(x, y) = a\delta(x)\delta(y) + \frac{b}{4}\left\{\left[\delta\left(\frac{x}{f\lambda} + \frac{\cos\theta}{p}\right) + \delta\left(\frac{x}{f\lambda} - \frac{\cos\theta}{p}\right)\right]\left[\delta\left(\frac{y}{f\lambda} + \frac{\sin\theta}{p}\right) - \delta\left(\frac{y}{f\lambda} - \frac{\sin\theta}{p}\right)\right] - \left[\delta\left(\frac{x}{f\lambda} + \frac{\cos\theta}{p}\right) - \delta\left(\frac{x}{f\lambda} - \frac{\cos\theta}{p}\right)\right]\left[\delta\left(\frac{y}{f\lambda} + \frac{\sin\theta}{p}\right) - \delta\left(\frac{y}{f\lambda} - \frac{\sin\theta}{p}\right)\right]\right\} \quad (23)$$

This reduces to $$\tilde{P}(x, y) = a\delta(x)\delta(y) + \frac{b}{2}\left[\delta\left(\frac{x}{f\lambda} + \frac{\cos\theta}{p}\right)\delta\left(\frac{y}{f\lambda} - \frac{\sin\theta}{p}\right) + \delta\left(\frac{x}{f\lambda} - \frac{\cos\theta}{p}\right)\delta\left(\frac{y}{f\lambda} + \frac{\sin\theta}{p}\right)\right] \quad (24)$$

The delta functions in Eq. (24) must be graphically represented as a line function rather than as a point function. The delta function products, however, only exist where the respective lines overlap. The distance from the DC to side orders is thus $$r = \sqrt{\frac{(\sin\theta)^2}{p^2} + \frac{(\cos\theta)^2}{p^2}} = \frac{1}{p} \quad (25)$$

The side orders are on an axis $x'$ rotated clockwise from the standard coordinates by the angle $$\phi = \cos^{-1}\left[\frac{p\cos\theta}{p}\right] = \theta \quad (26)$$

Thus, Eq. (24) can be written simply as $$\tilde{P}(x', y') = a\delta(x', y') + \frac{b}{2}\left[\delta\left(\frac{x'}{f} + \frac{1}{p}, y'\right) + \delta\left(\frac{x'}{f} - \frac{1}{p}, y'\right)\right] \quad (27)$$

In other words, we obtain the same Fourier transform as we did in Eq. (7) except that the transform plane coordinates are rotated by $\theta$. Therefore, to avoid the cumbersome expressions of rotated systems, the notation $$P(\rho, \theta_0) = \sum_{n=-\infty}^{\infty}\bigg|_{\theta_0} b_n e^{2\pi i \frac{n}{p}\rho} \quad (28)$$

will occasionally be adopted to indicate a one-dimensional periodic function in which the axis of the variable $\rho$ has azimuthal orientation $\theta_o$ in the $(\xi,\eta)$ plane ($\theta_o$ is measured clockwise from the vertical). The Fourier transform of Eq. (22) will then be $$\tilde{P}(r, \theta_0) = \sum_{n=-\infty}^{\infty}\bigg|_{\theta_0} b_n \delta\left(\frac{r}{f\lambda} + \frac{n}{p}\right) \quad (29)$$

where the $r$ axis is now in the $(x,y)$ plane at the angle $\theta_0$. It must be emphasized that $(\rho, \theta_o)$ and $(r, \theta_o)$ are not to be taken in general as cylindrical coordinates because Bessel transforms rather than Fourier transforms would then have to be used; the use of Bessel transforms in this discussion has been in the interest of keeping the explanation as simple as possible.

With an appropriate description of the photographic storage process, all the formalism necessary for a simple mathematical model of multiple image storage will be available. Since derivations of the complex amplitude transmittance for a processed photographic transparency are numerous in the literature, it will simply be stated that $$T_a(\xi, \eta) = \frac{E(\xi, \eta)^{-\gamma/2}}{E_0} \frac{E(\xi, \eta)^{-ih\gamma}}{E_0} \quad (30)$$

where $E_o$ and $h$ are constants of the process, $\gamma$ is the H and D curve slope, the exposure $E(\xi,\eta)$ equals $I(\xi,\eta)\,t$, $I(\xi,\eta)$ is the incident image (i.e., an intensity distribution), and $t$ is the exposure time. Normally, the phase term is eliminated in Eq. (30) by a liquid gate, and the constant $(E_o)^{\gamma/2}$ can be dropped so that for the rest of this discussion the amplitude transmittance can be taken to be $$T_a(\xi,\eta) = E(\xi,\eta)^{-\gamma/2}. \quad (31)$$

Two additional assumptions are implied in the simple relationship of Eq. (31); namely, that the gamma is constant over the exposure range $E^{min}(\xi,\eta)$ to $E^{max}(\xi,\eta)$ and the MTF (Modulation Transfer Function) of the emulsion is constant over the half-bandwidth of $E(\xi,\eta)$. These conditions can never be strictly satisfied but in practice are approached close enough to justify the use of Eq. (31).

As described in nonmathematical terms above and as claimed in the above-referenced copending application, the concept of the subject multiple image method is to take a sum of $N$ exposures $$\sum_{l=1}^{N} E_l(\xi,\eta)$$

and record them so that after processing, any image $E_l(\xi,\eta)$ can be viewed individually. First, each exposure is put on a spatial carrier by multiplying the exposure with a grating having a unique optically detectable characteristic which may be, for example, its frequency or spatial phase but which is preferably its azimuthal orientation. The grating is placed in physical contact with the recording emulsion and is rotated through an angle $\alpha$ after each exposure. The total exposure is $$E_{(\xi,\eta)}^{\text{Total}} = \sum_{l=1}^{N} E_l(\xi,\eta) P(\rho\theta_0 + (l-1)\alpha) \quad (36)$$

After processing, the transparency will have an amplitude transmittance of $$T_{|a|}(\xi, \eta) = \sum_{l=1}^{N} E_l(\xi, \eta) P(\rho, \theta_0 + (l-1)\alpha)^{-\gamma/2} \quad (33)$$

but if, in accordance with this invention, we linearly process it (i.e., make $\gamma=-2$) then the amplitude transmittance will be linearly proportional to the total input exposure, that is, $$T_{|a|}(\xi, \eta) = \sum_{l=1}^{N} E_l(\xi, \eta) P(\rho, \theta_0 + (l-1)\alpha). \quad (33a)$$

The effect of linear processing on crosstalk, and methods for implementing same will be treated in detail following this background mathematical treatment of multiple image storage.

If we transform this transparency in an optical system as shown in FIG. 4, we obtain $$\tilde{T}_{|a|}(x, y) = \sum_{l=1}^{N} \tilde{E}_l(x, y) * \sum_{n=-\infty}^{\infty} b_n \delta\left(\frac{r}{f\lambda} + \frac{n}{p}\right)\bigg|_{\theta_0+(l-1)\alpha} \quad (34)$$

We have so far discussed the recording and processing phases of multiple imagery and have briefly mentioned the retrieval phase. In Eq. (34) the amplitude distribution was propagated up to the transform plane of our retrieval device.

To perform a spatial filtering operation on Eq. (34) one of the spectra will be selected and transformed back to an image plane. I have found it to be satisfactory to pass $n=\pm 1$ orders with a maximum width of $E_i(x,y)$ no greater than $2x_o \sin \alpha/2$. Therefore, if our spatial filter is an opaque screen with an aperture of radius proportional to $\omega_o \sin \alpha/2$ placed in the transform plane so that only first-order spectra associated with one image passes, then $$\tilde{T}_{|\mathrm{a}|}^{\mathrm{Filtered}}(x, y) = b_1 \tilde{E}_1(x, y) * \delta\left(\frac{r}{f\lambda} \pm \frac{1}{p}\right)_{\theta_0 + (1-1)\alpha} \quad (35)$$

Transforming Eq. (35) produces the amplitude distribution $$T_{|\mathrm{a}|}^{\mathrm{Filtered}}(\sigma, \tau) = b_1 e^{\pm 2\pi i \frac{\sigma}{p}} \bigg|_{\theta-(1-1)\alpha} E_1(\sigma, \tau), \quad (36)$$

but the visible image is $$T_I^{\mathrm{Filtered}}(\sigma, \tau) = |T_{|\mathrm{a}|}^{\mathrm{Filtered}}(\sigma, \tau)|^2 = b_1^2 E_1^2(\sigma, \tau). \quad (37)$$

By rotating the spatial filter aperture through angular increments of $\alpha$ Eq. (37) predicts perfect retrieval of each recorded image. The image is quadratic with respect to the input exposure, but that is to be expected from the $\gamma=-2$ photographic storage. If we wanted a linear representation of the input exposure, the retrieval image in Eq. (37) could be printed with a $\gamma=-/2$ process.

With the preceding background in mind, the discussion of my crosstalk minimization methods will be more readily comprehended. As I indicated above, I have discovered three methods for minimizing or completely suppressing crosstalk during readout of selected images from a composite record, as described above.

Method 1. Linear Processing

It can be seen from Eq. (33) and (33a) that if the exposed photographic record is processed to $\gamma=-2$, the amplitude transmittance will be linearly proportional to the total input exposure. The composite record thus represents an intensity summation of the images recorded without any cross-product terms which, in effect, result in the formation in the record of spurious periodic functions capable of acting as carriers for crosstalk.

It has been found that the condition for linearity ($\gamma=-2$) is not critical in terms of image degradation for values of $\gamma \neq -2$. Assuming binary gratings, notice that for a two-image recording (the simplest case) Eq. (33) can be written as $$T_{|\mathrm{a}|}(\xi, \eta) = [E_1(\xi, \eta) + E_2(\xi, \eta)]^{-\gamma/2} P(\rho, \theta_1) P(\rho, \theta_2) +$$
$$E_1(\xi, \eta)^{-\gamma/2} P_{(\rho,\theta_1)}[1 - P_{(\rho,\theta_2)}] +$$
$$E_2(\xi, \eta)^{-\gamma/2} [1 - P_{(\rho,\theta_1)}] P_{(\rho,\theta_2)} +$$
$$\begin{pmatrix} 1 - \text{Neg.} \\ 0 - \text{Pos.} \end{pmatrix} [1 - P_{(\rho,\theta_1)}][1 - P_{(\rho,\theta_2)}] \quad (38)$$

The cross product term can easily be identified by rewriting Eq. (38) as $$T_{|\mathrm{a}|}(\xi, \eta) = E_1(\xi, \eta)^{-\gamma/2} P_{(\rho,\theta_1)} + E_2(\xi, \eta)^{-\gamma/2} P_{(\rho,\theta_2)}$$
$$+ \{[E_1(\xi, \eta) + E_2(\xi, \eta)]^{-\gamma/2}$$
$$- [E_1(\xi, \eta)^{-\gamma/2} + E_2(\xi, \eta)^{-\gamma/2}]\} P_{(\rho,\theta_1)} P_{(\rho,\theta_2)}$$
$$+ \begin{pmatrix} 1 \\ 0 \end{pmatrix} [1 - P_{(\rho,\theta_1)} - P_{(\rho,\theta_2)} + P_{1(\rho,\theta_1)} P_{(\rho,\theta_2)}] \quad (39)$$

Since the last term can at most add a constant to the image (which would only lower contrast), it may be dropped from further consideration. The third term in Eq. (39) is the source of the crosstalk, and in general it can be seen that the portion in brackets becomes small as $\gamma$ approaches $-2$. Thus, Eq. (39) supports a conclusion that small deviations from $\gamma=-2$ process will only introduce small amounts of crosstalk. In binary (0, 1) images, the third term vanishes not only when $\gamma=-2$, but also for all points where either $E_1(\xi,\eta)$ or $E_2(\xi,\eta)$ equals zero.

It has been shown mathematically that the cross-products are eliminated by making the amplitude transmission of the object transparency linearly proportional to the input intensity by which the exposures were made. To obtain this result in practice requires an analysis of the density versus log exposure curve for photographic material. A conventional equation for the intensity transmission of a photographic transparency is:

$T_I(x) = K I(x)^{-\gamma}$ where $K = 10^{-D_b} (t/E_o)^{-\gamma}$ the amplitude transmission for the transparency can be stated as:

$T_A(x) = T(x) = K I(x)^{\frac{-\gamma}{2}}$ $T_I(x)$ is the intensity transmission
$K$ is a constant
$I(x)$ is the intensity distribution of an image formed by uniformly illuminating a transparency
$\gamma$ is the slope of the density versus log exposure curve
$E(x)$ is the exposure impressed on the photographic material
$D_b$ is the base density of the photographic material
$t$ is the time duration of exposure
$E_o$ is the threshold exposure required to produce a density increase above base density $D_b$
$T_A(x)$ is the amplitude transmission.

The equation for amplitude transmission can be made linear with input intensity transmission by setting gamma equal to $-2$. It must be recognized, however, that for this to have any valid effect the gamma must also be constant. For example, it becomes essential that no image exposure be made in a nonlinear portion of the density versus log exposure curve.

In processing the images for a constant gamma of $-2$, it is necessary to relate this gamma to the coherent optical system. It has been found that measured density versus log exposure curves vary with the conditions of measurement. Thus curves measured with a densitometer, a microdensitometer, and in a coherent system are all different. These differences are apparently due to differences in diffuse and spectral density which in turn relate to the graininess of the photographic emulsion. For the present invention the gamma must be determined by measurement in a coherent optical system such as used to separate and display the images.

The following two examples illustrate specific methods that have been used in practicing the 1

EXAMPLE 1

Figure 6:
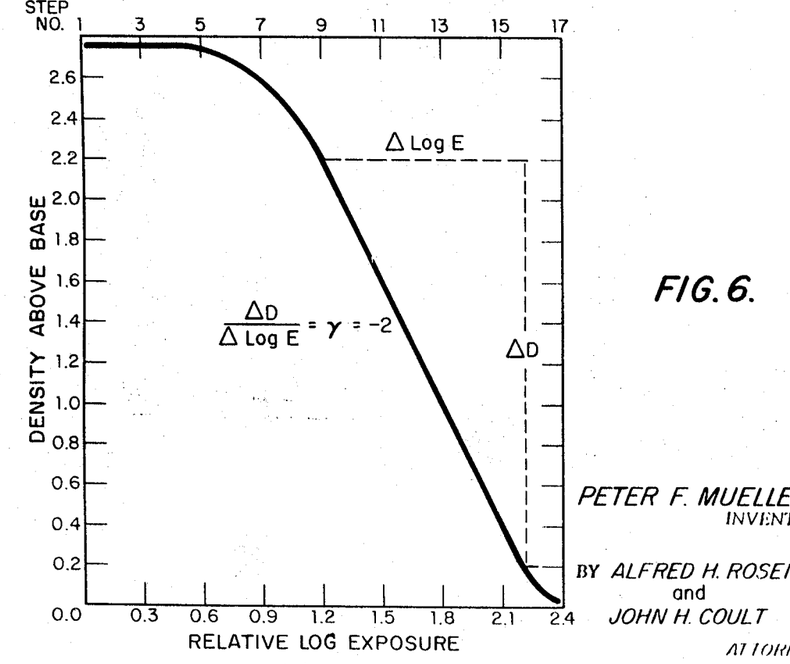
FIG. 6 is a graphical illustration of a density versus log exposure curve for reversal processing in accordance with a second embodiment of the invention.

Three exposures were made under the same conditions as set forth for the binary image storage previously described. The same 12 lines per millimeter grating was used and the objects had maximum spatial frequencies of 6 lines per millimeter. The photographic plate used in the camera had a reversal process density versus log exposure curve with a gamma of $-2$ as illustrated in FIG. 6. The plate was uniformly preexposed so that the object exposures fill in the straight portion of the exposure curve. The maximum total exposure was limited so that this also did not go beyond the straight line portion of the curve.

The three continuous tone images were read out separately in the coherent system of FIG. 4 with the spatial filter 28 passing one-third order diffraction spectrum of each. The displayed images were very good quality with only the faintest ghosting of the other images observable upon close scrutiny.

EXAMPLE 2

Figure 7:
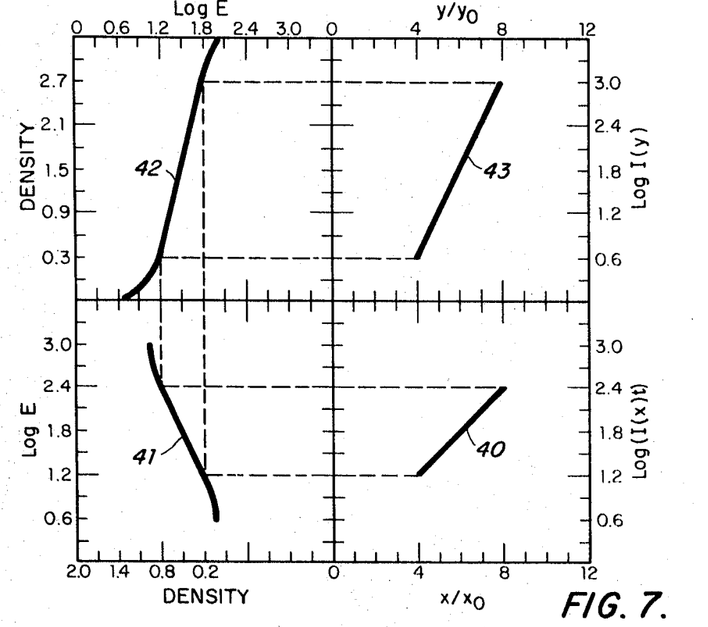
FIG. 7 is a graphical illustration of double negative processing to obtain the results of the reversal processing of FIG. 6.

Exposures were made the same as in Example 1 but using a film normally processed to a gamma of one-half as shown by curve 41 in FIG. 7. Again the film was uniformly preexposed to eliminate the nonlinear foot of the exposure curve and the maximum exposure was also limited so as to remain in the straight line portion of the curve. This film was normally processed and then projection printed onto a high resolution plate having a normal process gamma of 4 as shown in curve 42 of FIG. 7. Again normal processing was used and the result was a transparency as shown in curve 43 having an intensity equal to the square of the input intensity as represented by curve 40. This transparency was displayed in the coherent system as before with similar results.

In recording images with amplitude linearly proportional to input intensity, it has been found that optical thickness variations in the recording medium (some introduced by processing) affect linearity and cause image degradation in readout. These variations are minimized by using what has been called a "liquid gate." A liquid with an index of refraction closely matching that of the recording that of the recording medium is coated over one or both sides of the medium. When the recording medium has a substrate that maintains a surface free of variations only the free surface of the storage layer may be liquid coated. For most photographic emulsions, the liquid should have a refractive index of about 1.4 to 1.5. One suitable liquid is $n$-Dibutyl Phthalate. Xylene has also been used. Sandwiching the recording medium with glass so that the liquid coating is sandwiched between the two provides long term protection and stability for the liquid gate.

Method 2. Narrow Slit Gratings

A second method for suppressing crosstalk during retrieval involves the geometry of the grating used during the recording step and is operable irrespective of the processing linearity. If a grating can be selected which has the effect that $$|\tilde{P}_{(x,\theta_1)} * \tilde{P}_{(x,\theta_2)}| << |\tilde{P}_{(x,\theta_1)}| \quad (40)$$

for orders along the $\theta_1$ axis, then crosstalk will be virtually eliminated from $E_1(\sigma,\tau)$ retrieval independent of the process gamma. This method is thus radically different from that offered by the linear storage concept. Consider a two image composite record. By taking the Fourier transform of Eq. (39) and substituting Eq. (16) with $T=1$ and $t=0$ (also let $\theta_1=0$ and $\theta_2=Qb/2$) we obtain $$\tilde{T}_{|a|}(x,y)$$
$$= \sum_{n=-\infty}^{\infty} \left(1-\frac{a}{p}\right) \operatorname{sinc} n\pi\left(1-\frac{a}{p}\right) \left[\delta\left(\frac{x}{f\lambda}+\frac{n}{p}\right) * A_1(x,y)\right]$$
$$+ \sum_{m=-\infty}^{\infty} \left(1-\frac{a}{p}\right) \operatorname{sinc} m\pi\left(1-\frac{a}{p}\right) \left[\delta\left(\frac{y}{f\lambda}+\frac{m}{p}\right) * A_2(x,y)\right]$$
$$+ \sum_{n=-\infty}^{\infty}\sum_{m=-\infty}^{\infty} \left(1-\frac{a}{p}\right)^2 \operatorname{sinc} n\pi\left(1-\frac{a}{p}\right) \operatorname{sinc} m\pi\left(1-\frac{a}{p}\right)$$
$$\left[\delta\left(\frac{x}{f\lambda}+\frac{n}{p}\right) * \delta\left(\frac{y}{f\lambda}+\frac{m}{p}\right)\right] * A_3(x,y)$$
$$(41)$$

where $A_1(x,y)$ $A_2(x,y)$ and $A_3(x,y)$ are the Fourier transforms of $E_1$ $(\xi,\eta)$ $E_2$ $(\xi,\eta)$ and $[E_1(\xi,\eta)+E_2(\xi,\eta) -(E_1(\xi,\eta)+E_2(\xi,\eta))]$, respectively. If we assume $A_1(x,y)$, $A_2(x,y)$, and $A_3(x,y)$ are properly bandlimited, then at the $n=-1$, $m=$ order the amplitude is $$\tilde{T}_{|a|}(x,y)\Big|_{\substack{n=-1\\m=0}} = \left(1-\frac{a}{p}\right) \operatorname{sinc} \pi\left(1-\frac{a}{p}\right)$$
$$\left[\delta\left(\frac{x}{f\lambda}-\frac{1}{p}\right) * A_1(x,y)\right] + \left(1-\frac{a}{p}\right)^2 \operatorname{sinc} \pi\left(1-\frac{a}{p}\right)$$
$$\left[\delta\left(\frac{x}{f\lambda}-\frac{1}{p}\right) * A_3(x,y)\right]\tilde{T}_{|a|}(x,y)\Big|_{\substack{n=-1\\m=0}}$$
$$= \left(1-\frac{a}{p}\right) \operatorname{sinc} \pi\left(1-\frac{a}{p}\right) \left[A_1\left(x-\frac{f\lambda}{p}y\right)\right.$$
$$\left. + \left(1-\frac{a}{p}\right)A_3\left(x-\frac{f\lambda}{p}y\right)\right]$$
$$(42)$$

Although there is no justification for dropping the $A_3(x-f\lambda/p,y)$ term in general, no matter how small $(1-a/p)$ is (i.e., no matter how narrow the grating slit), it is clearly shown that narrow-slit gratings will produce carrier functions on the record which generate less crosstalk than is the case if wide-slit gratings are employed. Stated in another way, this method involves the formation of carrier functions on the record having a duty-cycle (the fraction of the carrier period during which the carrier is "on") which is substantially less than one-half. For example, the first-order retrieval from a record having a carrier function with a duty-cycle of one-half will have approximately five times greater crosstalk (in amplitude) than from a record having a carrier function whose duty-cycle is one-tenth.

The invention is not limited to the particular details of construction of the embodiments depicted, and it is contemplated that various and other modifications and applications will occur to those skilled in the art. For example, color separation images may be stored and retrieved with suppressed crosstalk using the principles of this invention, as taught in my copending applications Ser. No. 564,340, filed July 11, 1966; and Ser. No. 726,455, filed May 3, 1968. Further, the teachings of my invention may be adopted, as suggested, to storage and retrieval of multiple images respectively impressed on carriers of like orientation but different spatial frequency.

Since certain changes may be made in the above-described process without departing from the true spirit and scope of the invention herein involved, it is intended that the subject matter of the above depiction shall be interpreted as illustrative and not in a limiting sense.

I claim:

1. A method of making a photostorage record which is a composite of a plurality of different images capable of being interrogated with minimal crosstalk using Fourier transformation and spatial filtering techniques to separate in a Fourier transform space spectra respectively associated with said different images, comprising:
   recording in additive superposition on a recording medium a plurality of record functions each of which is multiplied with a substantially periodic carrier function having a unique optically detectable characteristic;
   processing said medium; and
   during said recording and processing minimizing the formation in said recording medium of a spurious periodic function resulting from the said superposition and thus the intersection of said carrier functions respectively associated with said record functions.

2. A method as defined by claim 1 wherein said medium stores information as a density image and wherein said minimization is achieved by processing said medium to about $\gamma=-2$.

3. A method as defined by claim 1 wherein said minimization is achieved by forming said periodic carrier functions with duty cycles substantially less than one-half.

4. A method as defined by claim 3 wherein said duty cycle of said carrier functions is between about 10 percent and about 20 percent.

5. A process for making a photostorage record comprising:
making a plurality of image exposures on the same recording area of photostorage medium, each exposure being made through a light modulating device imparting to the exposure a spatially-distributed periodic modulation with a unique characteristic so arranged relative to the characteristics of the other exposures that if, after processing the record, it is illuminated with light which is at least partially coherent at said record, diffraction orders of said modulations each convolved with a spectrum of the associated image will be erected spatially separated in a transform plane; and
processing said medium to develop said plurality of images in a transparency having an amplitude transmittance which is substantially linearly proportional to the input intensity by which said exposures were made, said medium being processed to a substantially constant gamma of substantially minus two.

6. A photostorage process comprising:
consecutively making a plurality of image exposures of a single area on a photostorage medium through an amplitude diffraction grating with the grating having different angular orientations for each exposure to obtain a latent composite image;
processing said medium to a gamma of about minus two to obtain a transparency having an amplitude transmission which is linearly proportional to the input intensity when illuminated with light of uniform amplitude;
placing said medium in a coherent optical system so as to form the spectrum of said composite image in a transform plane; and
positioning a spatial filter in said transform plane so as to separate an image corresponding to one of said plurality of exposures by selectively passing a diffraction order greater than zero of said grating as it was oriented during said one of said plurality of exposures along with the image spectrum centered in said order.

7. A photostorage and retrieval process, comprising:
making a plurality of image exposures of a single area on a photostorage medium through an amplitude diffraction grating with the grating having different angular orientations for each exposure to obtain a latent composite image;
processing said medium to a gamma of about minus two to obtain a transparency having an amplitude transmission which is linearly proportional to the input intensity when illuminated with light of uniform amplitude;
placing said medium in a coherent optical system so as to form the spectrum of said composite image in a transform plane; and
positioning a spatial filter in said transform plane so as to separate an image corresponding to one of said plurality of exposures by selectively passing a diffraction order greater than zero of said grating as it was oriented during said one of said plurality of exposures along with the image spectrum centered in said order, said constant gamma of minus two being obtained by exposing a second photosensitive material to said medium, said material and said medium having gammas that will multiply to a gamma of minus two as a result of double negative processing; and wherein said process further comprises controlling each exposure so as to remain on the linear portions of the H and D curves for both the medium and the material.

8. A photostorage and retrieval process comprising:
making a plurality of image exposures of a single area on a photostorage medium through an amplitude diffraction grating with the grating having different angular orientations for each exposure to obtain a latent composite image;
processing said medium to a gamma of about minus two to obtain a transparency having an amplitude transmission which is linearly proportional to the input intensity when illuminated with light of uniform amplitude;
placing said medium in a coherent optical system so as to form the spectrum of said composite image in a transform plane; and
positioning a spatial filter in said transform plane so as to separate an image corresponding to one of said plurality of exposures by selectively passing a diffraction order greater than zero of said grating as it was oriented during said one of said plurality of exposures along with the image spectrum centered in said order, said constant gamma of minus two being obtained using a photostorage medium that will reversal process to a gamma of minus two, said process further comprising preexposing said medium with a weak exposure sufficient to cover the nonlinear "foot" of the H and D curve of the medium, limiting said exposures so that the maximum exposure in any one spot does not exceed the linear portion of the H and D curve for the medium and reversal processing said medium to obtain a gamma of minus two.